Nov. 14, 1944.  F. NETTEL  2,362,714
STARTING COMBUSTION TURBINE
Original Filed June 13, 1941
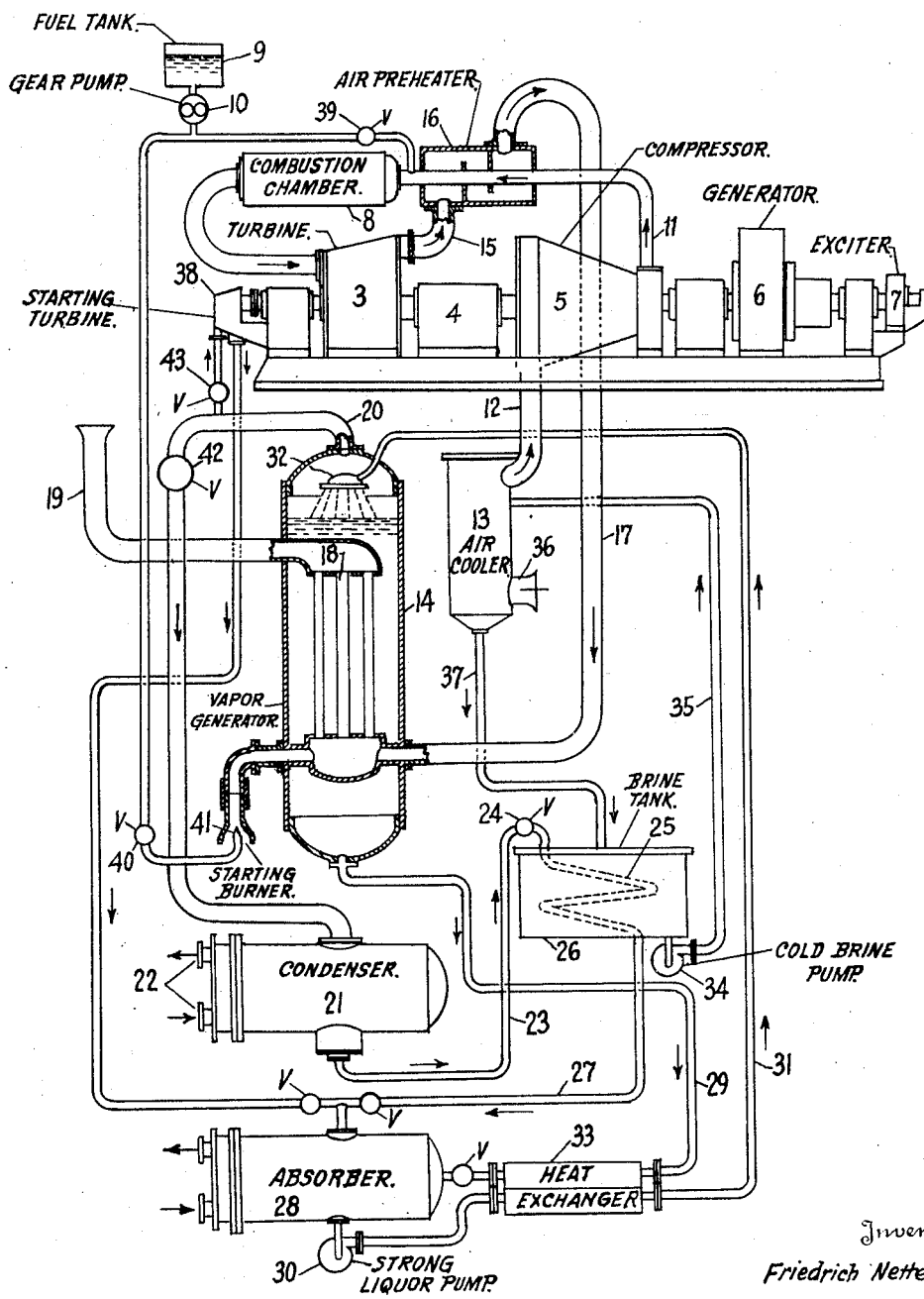
Inventor
Friedrich Nettel.
By W. Glenn Jones
Attorney Patented Nov. 14, 1944

2,362,714

UNITED STATES PATENT OFFICE 2,362,714

STARTING COMBUSTION TURBINES

Friedrich Nettel, Manhasset, N. Y.

Original application June 13, 1941, Serial No. 397,980, now Patent No. 2,339,185, dated January 11, 1944. Divided and this application August 17, 1943, Serial No. 498,995

4 Claims. (Cl. 60—41)

This invention relates broadly to combustion turbines such as are shown in my copending applications, Serial Nos. 309,359, now Patent Number 2,322,717, and 330,801, filed December 15, 1939, and April 20, 1940, respectively, and more particularly to means to start the system. The present application is a division of my copending application Serial Number 397,980, filed June 13, 1941, now Patent Number 2,339,185.

Among the several objects of this invention are:

To provide simple and useful means for starting combustion turbines operating on a refrigeration cooling cycle;

To employ vaporized refrigerant as a working substance to drive a prime mover to start the said combustion turbines.

The drawing is a schematic layout of a system that illustrates the present invention.

Combustion turbines cannot be set in operation from standstill without an outside power impulse. In this respect, the combustion turbine is in an even less favorable position than the reciprocating internal combustion engine for which a short cranking is generally sufficient for starting.

In combustion turbines as known in the art, it is generally necessary to bring the speed up to about twenty-five per cent of the normal working speed before the air compressor begins to deliver sufficiently to permit the burner in the combustion chamber to be started. The power required for starting has been provided by either an electrical or a mechanical starting motor. While electric starting is convenient, a source of electric power is not always available and consequently the present invention has been made to avoid the necessity of such power source.

Referring now in the drawing, the combustion turbine 3 is connected to shaft 4 that transmits driving torque through air compressor 5, electric generator 6 and exciter 7. It will be understood that, if desired, the compressor 5 may be driven by a separate turbine. The hot gaseous working substance is produced by combustion of fuel in combustion chamber 8 where a suitable material such as oil supplied from fuel tank 9 by gear pump 10 is mingled with air conducted to combustion chamber 8 from compressor 5 through the pipe 11. The air intake to compressor 5 is through conduit 12 from air cooler 13 where the air is cooled before compression as will be hereinafter described.

The vapor generator, or still, 14 contains a refrigerant, such as ammonia gas, in a liquid carrier, such as water. The hot exhaust gases from turbine 3 pass through pipe 15 to air pre-heater 16, thence, through pipe 17 to heat exchanging device 18 immersed in the liquid in vapor generator 14 where a considerable portion of the rejected heat from turbine 3 is transferred to the liquid and evaporates the ammonia gas, the discharge to atmosphere being through pipe 19.

The ammonia vapor driven off from the solution in vapor generator 14 passes through pipe 20 to condenser 21 where it is condensed by cooling water introduced and discharged through the openings 22. The condensed gas is carried through pipe 23 and expansion valve 24 to a brine coil 25 in brine tank 26 where the ammonia is expanded and takes up heat from the brine in the well known manner. The ammonia then passes through pipe 27 to absorber 28 where it mingles with weak ammonia solution carried from still 14 through pipe 29 with the result that the ammonia is absorbed and is then transferred by the strong liquor pump 30 through pipe 31 to sprayhead 32 in the vapor generator 14. Heat exchanger 33 transfers heat from the weak liquor in pipe 29 to the strong liquor in pipe 31.

The refrigerated brine is transferred from tank 26 by means of brine pump 34 through pipe 35 to a sprayhead (not shown) in the air cooler 13 where all the air drawn in at intake 36 must pass through the cold spray before going through pipe 13 to compressor 5. The brine is returned to tank 26 through pipe 37. When the turbine 3 is operating normally the rejected heat therefrom will be sufficient to provide the necessary refrigeration to cool the air taken into compressor 5 to reduce the work required to compress the air, as is well known.

Starting from standstill is accomplished by a small ammonia vapor turbine 38 that may be coupled to shaft 4 by a clutch or continuously as shown in the drawing, or it may be connected separately to compressor 5. In the last mentioned case suitable clutches would be provided to connect compressor 5 to shaft 4. When it is desired to start the system, valve 39 is closed and valve 40 is opened so that fuel is carried to starting burner 41, from which the hot products of combustion are passed through heat exchange device 18 to generate ammonia vapor under pressure. The valve 42 is closed and valve 43 is opened so that the ammonia vapor is carried to turbine 38 to drive turbine 38 and impart sufficient speed to compressor 5 to deliver the necessary supply of air to combustion chamber 8 for starting the main turbine 3. After the compressor 5 has reached sufficient speed, valve 40 is closed and valve 39 is opened to supply fuel to combustion chamber 8. Also, valve 43 is closed and valve 42 is opened to permit the normal circulation of ammonia vapors from still 14 to condenser 21.

It is thus apparent that my present invention provides a system having means to utilize at least a portion of the rejected heat from the turbine and contemplates broadly the utilization of rejected heat from a heat engine in a thermo-electric system.

My invention further contemplates broadly the use of a refrigerant vapor to set the system in operation.

I claim:

1. A power system, including a combustion turbine, an air compressor to compress air for combustion, and absorption refrigeration apparatus to cool the air before compression, said apparatus comprising a closed shell to contain a refrigerant absorbed in a liquid carrier, means in said shell to transfer heat from exhaust gases from said turbine to evaporate said refrigerant, means to burn fuel and pass the gases of combustion through said means in said shell to evaporate refrigerant when said turbine is not operating, a second turbine connected to drive said compressor, and means to conduct evaporated refrigerant from said shell to drive said second turbine.

2. A power system, including an engine drivable by hot working substance, combustion means to produce said hot working substance, an air compressor to compress air for combustion in said combustion means and an absorption refrigeration system to cool the air before compression, said refrigeration system comprising a closed shell to contain a refrigerant absorbed in a liquid carrier, means in said shell to transfer rejected heat from said engine to evaporate said refrigerant, means to burn fuel and pass the gases of combustion through said means in said shell to evaporate refrigerant when said engine is not operating, a prime mover connected to drive said compressor, and means to conduct evaporated refrigerant from said shell to drive said prime mover.

3. A power system, comprising thermal power mechanism including a combustion device, means to compress air for use in said combustion device, means to cool said air before compression including a refrigeration system having a vapor generator connected to receive heat from said power mechanism, a prime mover connected to drive said compressing means, a second combustion device disposed to generate vapor in said vapor generator when said second combustion device is in operation, and means to conduct vapors from said vapor generator to drive said prime mover.

4. A power system, comprising thermal power mechanism including a combustion device, means to compress air for use in said combustion device, a vessel containing a gaseous substance in a liquid carrier, a second combustion device disposed to heat said carrier and drive said gaseous medium from said carrier when said second combustion device is operating, a prime mover connected to drive said compressing means, and means to conduct the gaseous medium driven off from said carrier to drive said prime mover.

FRIEDRICH NETTEL.